Nov. 19, 1935  E. E. KLEINSCHMIDT ET AL  2,021,419
KEYBOARD PERFORATOR AND COUNTER
Original Filed Sept. 4, 1929   6 Sheets-Sheet 1

INVENTORS:
E. E. KLEINSCHMIDT
L. M. POTTS
BY
ATTORNEY

Nov. 19, 1935.  E. E. KLEINSCHMIDT ET AL  2,021,419
KEYBOARD PERFORATOR AND COUNTER
Original Filed Sept. 4, 1929  6 Sheets-Sheet 2

Fig. 3

INVENTORS:
E. E. KLEINSCHMIDT
L. M. POTTS
BY
ATTORNEY

Nov. 19, 1935.   E. E. KLEINSCHMIDT ET AL   2,021,419
KEYBOARD PERFORATOR AND COUNTER
Original Filed Sept. 4, 1929   6 Sheets-Sheet 3

INVENTORS:
E. E. KLEINSCHMIDT
L. M. POTTS
BY
ATTORNEY

Nov. 19, 1935.   E. E. KLEINSCHMIDT ET AL   2,021,419
KEYBOARD PERFORATOR AND COUNTER
Original Filed Sept. 4, 1929   6 Sheets-Sheet 5

INVENTORS:
E. E. KLEINSCHMIDT
L. M. POTTS
BY
ATTORNEY

Patented Nov. 19, 1935

2,021,419

UNITED STATES PATENT OFFICE 2,021,419

KEYBOARD PERFORATOR AND COUNTER

Edward E. Kleinschmidt, Highland Park, and Louis M. Potts, Evanston, Ill., assignors to Teletype Corporation, Chicago, Ill., a corporation of Delaware Original application September 4, 1929, Serial No. 390,352. Divided and this application September 2, 1932, Serial No. 631,530

29 Claims. (Cl. 164—113)

The present invention relates to typesetting systems and apparatus therefor and especially to perforators and counters which may be utilized for preparing a perforated tape for the automatic control of composing machines of the linecasting type.

This application is a division of application Serial No. 390,352, filed September 4, 1929, which eventuated into United States Patent No. 2,000,029, granted May 7, 1935, and relates particularly to improved means for indicating simultaneously the cumulative thicknesses of matrices composing the line and the justifiability of the line resulting from the expansible spacebands or word spacers introduced in the line.

In the typographical art, composing machines of the linecasting type are provided with character matrices which are of different thicknesses due to the fact that the characters vary in width, and also expansible spacebands. When the character matrices are assembled into a line of predetermined definite length the number of matrices necessary to complete the line varies with the particular matrices used; the length of line, therefore, is dependent not upon the number of characters in the line, but rather upon thicknesses of the characters or matrices making up the line. Consequently, it is necessary during the assembling of the matrices in the assembly elevator or in the preparation of a perforated tape representing a line of composed matter to totalize the various thicknesses of the matrices corresponding to the code perforations made in the tape, so that the operator will be apprised at all times of the length of line remaining as each key is operated and can thus judge of the justifiability of the line.

Cooperating with the character matrices and equally determinative of the justifiability of the line are the expansible spacebands or word spacers which are inserted into the composed line at points representative of word spaces. It is essential, therefore, that the indicator take cognizance of the expansibility of the spacebands as well as the totalization of the character matrices, and that these two functions be performed simultaneously and the net or resultant effect be apparent to the operator at all times.

It is the primary object of the present invention to provide means for integrating or totalizing the widths of characters and justifying members.

Another object of this invention is to provide an indicating mechanism which simultaneously accomplishes the two-fold object of totalizing the thicknesses of the matrices and determining the cumulative expansibility of the spacebands to indicate to the operator a resultant effect.

A better understanding of the invention may be had from the following description, taken with the accompanying drawings, wherein.

Briefly, the indicator, which must be understood to be inclusive of the counting mechanism, comprises a scale member composed of a number of similar scales and an index member which function cooperatively to indicate constantly the justifiable condition of the line. Each of the scales is provided with uniform and coincident graduations, and is proportionately marked to indicate the minimum and maximum thicknesses, and degree of expansibility of varying numbers of spacebands. The space key operates to alter the angular position of the scales, and the character keys operate to actuate through a counting mechanism an index member which in the present embodiment comprises a helical-edged shutter member, the helical edge of which functions as the index.

Figures 1, 2:
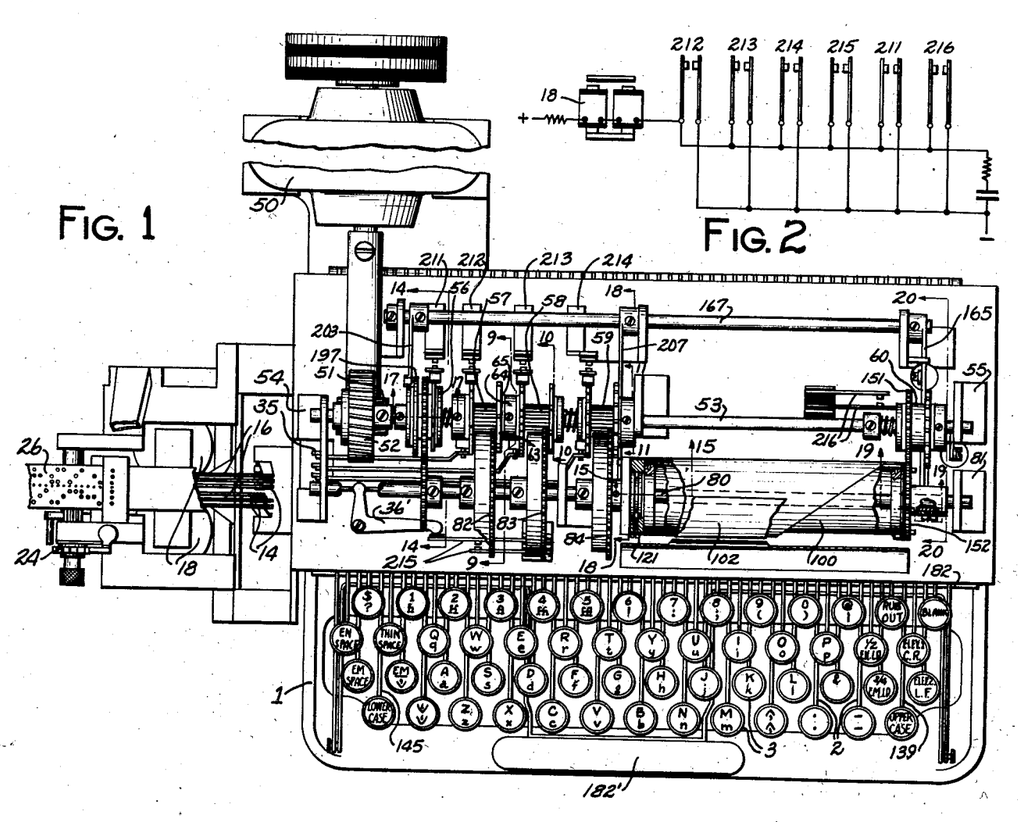
Fig. 1 is a plan view of the perforator and counter incorporating the present invention.
Fig. 2 is a diagram showing the electric circuits and switches for controlling the perforating control magnet.

The machine comprises a frame 1 having at its front the usual keyboard comprising keylevers 2 operable by keys 3. Each keylever is pivoted to the frame as shown at 4, Fig. 21, and is provided with a return spring 5 near its pivot for returning the lever to its normal position after it has been operated. Each spring 5 has one of its ends attached to the frame 1 and its other end connected with a lever 2.

Figure 3:
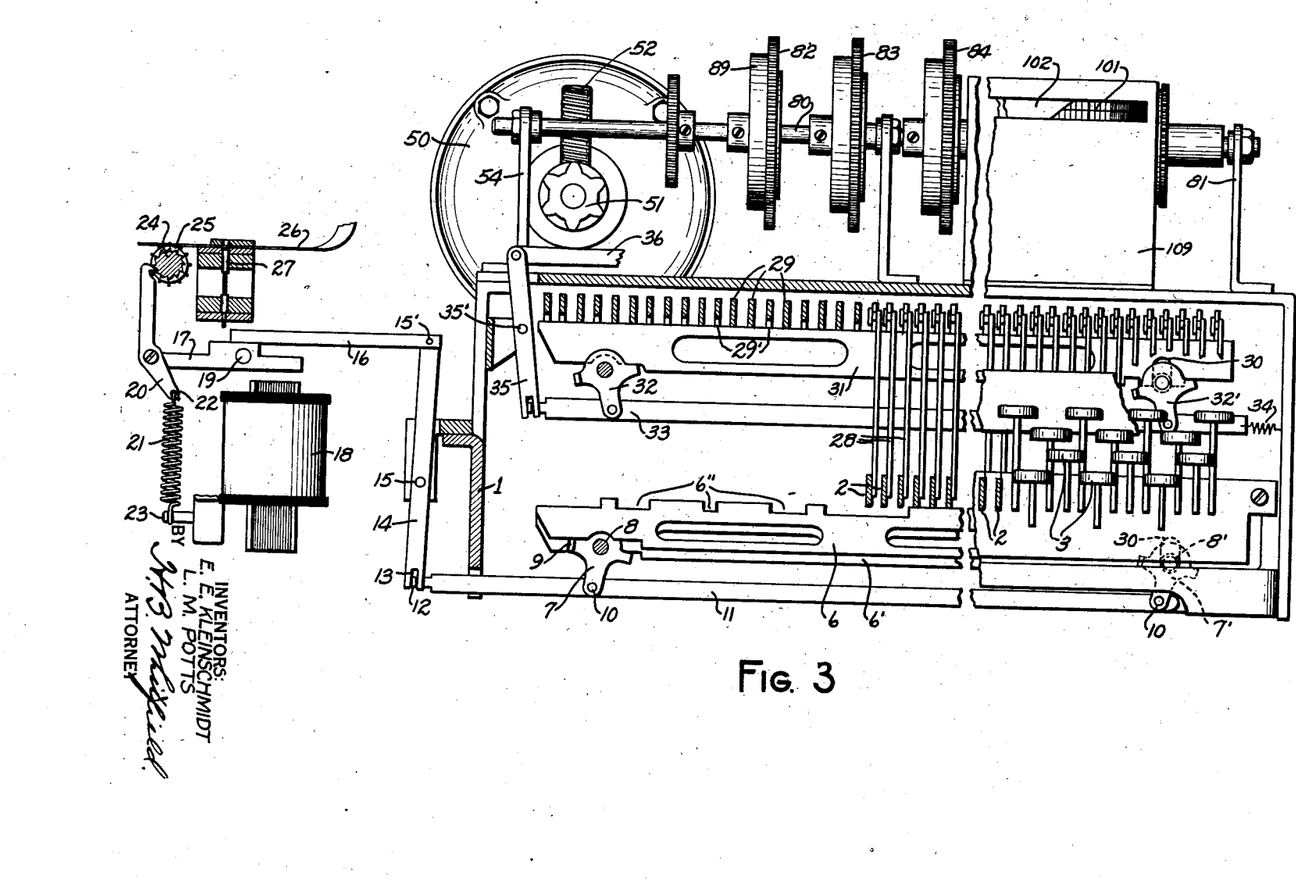
Fig. 3 is a front elevation of the perforator and counter with portions in section.

Arranged underneath the keylevers is a plurality of pairs of permutation bars 6 and 6', Fig. 3, the upper edges of which are provided with notches 6''. Each pair of bars 6 and 6' rests upon a pair of rocking members 7 and 7' which are mounted upon pins 8 and 8' respectively, Figs. 3 and 21. Each rocking member 7 has an ear 9 extending forward to support a bar 6 and another ear, shown in Fig. 21, extending backward to support the companion bar 6'. Similarly, each rocking member 7' has one ear for supporting a bar 6 and another for supporting the companion bar 6'.

The rocking members 7 and 7' are pivotally connected at 10 to a horizontal bar 11. This bar has at its end, an ear 12 engaging a slot 13 formed in one end of a lever 14 which is pivoted at 15 and has pivotally connected to its other end 15' a link 16. It will be understood that there are a plurality of bars 11, one for each pair of permutation bars 6, 6' and that each bar 11 is operatively connected with a link 16 by a lever 14.

The links 16 are slidable in slots (not shown) in armature 17 of electromagnet 18. The armature 17 is pivoted at 19 and has pivotally mounted on its end a pawl 20. A spring 21 has one of its ends connected to one end of the pawl at 22 and its other end connected to a fixed point at 23. The other end of the pawl cooperates with a ratchet 24 which is secured to a feed wheel 25.

The teeth of the feed wheel 25 cooperate with the feed perforations in the tape 26 for feeding the tape. A plurality of punch pins 27 are arranged for perforating the tape in accordance with the operation of the keys on the keyboard which operation will now be described. It will be understood that a punch to perforate the feed hole is also provided and is invariably operated each time a group of perforations is made.

When a key 3 is depressed its lever 2 will engage the upper edges of combinations of the permutation bars 6, 6' and these bars will be depressed. It will be understood that for each key depressed a different combination of permutation bars will be operated.

When a permutation bar 6 is depressed, its lower edge engages with ears 9 of rocker members 7, 7' causing the latter to rock on their pivots 8 producing at the same time an upward movement of the other ears of the rocker members and the consequent upward movement of the companion permutation bar 6'. This upward movement of the bar 6' is permitted by reason of the fact that the upper edge of bar 6 is notched at points where the upper edge of bar 6 is not notched and vice versa. The permutation bars, when moving downward, are guided to move vertically by the guide slots 30 (Fig. 3) which span a collar 8' mounted on the pin 8.

The permutation bars which have been depressed by the key lever 2 rock their rocker members 7 and 7' to swing their bars 11 to the right, rotating their levers 14 counterclockwise and their links 16 to the left positioning the links beneath the punch pins 27. The magnet 18 will then be energized by mechanism which will be described hereinafter. Energization of the magnet rocks the armature 17 clockwise forcing the links 16 upwardly against the punch pins 27 to perforate the tape. Simultaneously with the perforating operation, the pawl 20 will move up to engage the next tooth on the ratchet 24. When the magnet is deenergized, the spring 21 draws the pawl down rotating the ratchet one step and feeding the tape to position it for the next perforating operation. In this manner the tape is perforated in accordance with the operation of the keylevers 2. The elevated bars 6' will be returned by the next key operated provided the corresponding hole is not to be perforated, as that keylever will engage a high part of bar 6'. If the corresponding hole is to be perforated the bar 6' will remain elevated.

The connections leading from the keylevers 2 to the counting mechanism will now be described. Each keylever 2 is connected by means of a link 28 with a lever 29 as shown in Fig. 3. The levers 29 are arranged side by side and run parallel with the keylevers 2. Underneath the levers 29 and running parallel with the permutation bars 6, 6' are four bars 31 similar in construction to the bars 6', except that they do not have notches in their upper edges. The levers 29, however, are provided with notches 29' in their lower edges. These notches are so cut that when a lever 29 is depressed its lower edge engages only one of the bars 31, the notches 29' providing clearance for the other bars 31. The arrangement is such that depression of a key to transmit a wide letter such as the letter M will result in the depression of one of the bars 31, depression of a key to transmit a letter of medium width such as the letter S will result in the depression of a second bar 31 and depression of a key to transmit a narrow letter such as the letter I will result in depression of a third bar 31.

Each of these bars 31 rests on the ears of two rocker members 32 and 32' similar to rocker members 7 and 7'. For each bar 31 there is provided a bar 33 which has connected to one end a spring 34 for returning the bar 33 to its normal position. Each bar 33 is connected to one end of a lever 35 which is pivoted at 35' and has its other end connected by a link 36 with one arm of a bell crank lever 37 (see Fig. 12). The other arm of each bell crank lever has connected thereto one end of a spring 38, the other end of which is connected to a fixed point on the frame of the machine. The bell crank levers 37 have slot connections with pins 39 which are secured to escapement pawls 40 (see Figs. 9, 10 and 11).

The fourth bar 31 is operated whenever a key such as "blank" or "rubout" which do not operate the counter is depressed as will be described later. Operation of this fourth bar moves the associated rocking members 32 and 32', bar 33, lever 35, link 36 and bell crank lever 36' to bring contacts 215 into engagement with each other. This closes one of a plurality of parallel circuits (see Fig. 2) to energize magnet 18 to perforate the tape in accordance with the key operated, but does not operate any part of the counting mechanism.

Escapement pawls 40 through their teeth 40' control three friction mechanisms 57, 58 and 59 mounted upon a shaft 53 which is journaled in brackets 54 and 55 mounted on the frame 1. The shaft 53 is driven at a suitable speed by a motor 50 through gears 51 and 52. In addition to members 57, 58 and 59 there are two other friction driven mechanisms 56 and 60 mounted on shaft 53. The construction of these other mechanisms 56 and 60 will be described later.

Figures 9, 10, 11, 12, 13:
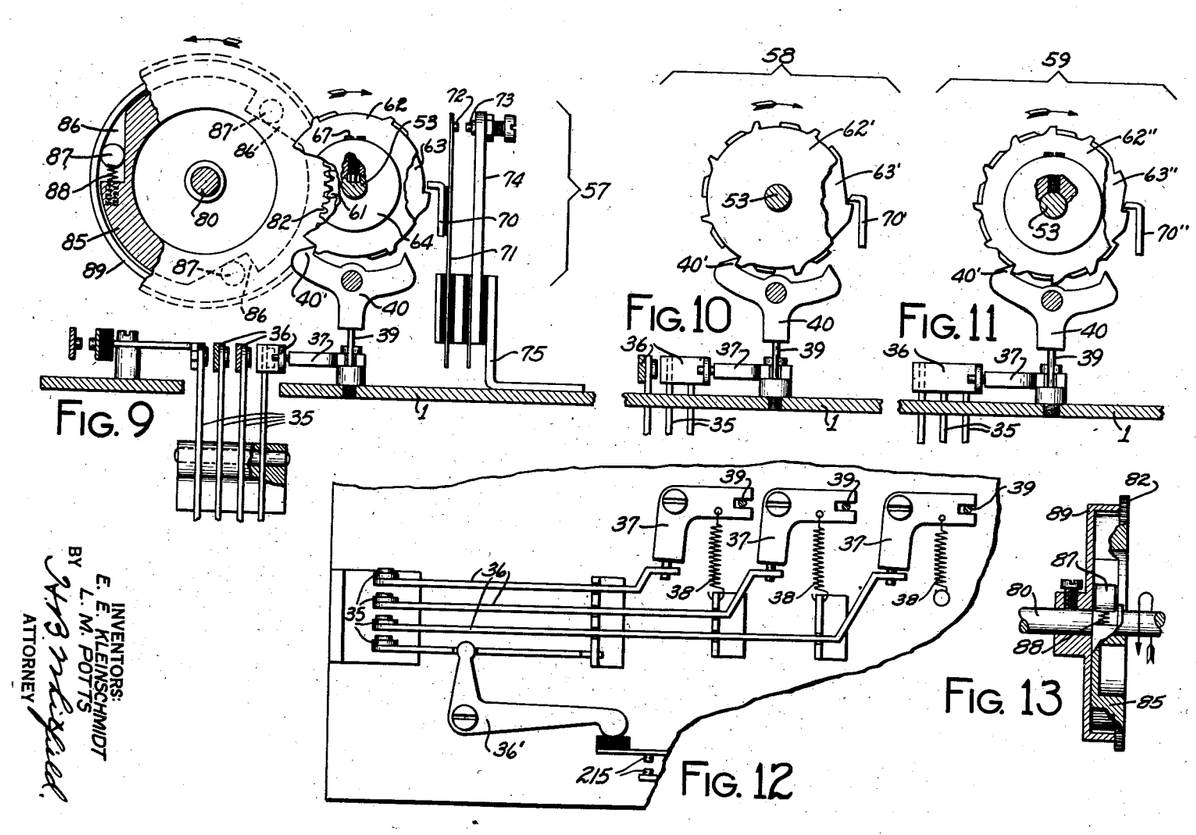
Figs. 9, 10 and 11 are part sectional and part elevational views showing portions of the counter escapement mechanism, the sections being taken along lines 9—9, 10—10, 11—11, respectively of Fig. 1.
Fig. 12 is a plan view of the release mechanism for the escapements.
Fig. 13 is a sectional view of the roller clutch.

Mechanism 57, see Fig. 9, is composed of a pinion 61, a six-tooth ratchet wheel 62 and a six-tooth cam disc 63, all rigidly connected together and loosely mounted on shaft 53. A collar 64 is secured to the shaft 53 by means of the screw 67, the tip of which extends into a slot in shaft 53, so that the collar rotates with the shaft but can slide longitudinally along the shaft. Between the collar 64 and the cam disc 63 there is a friction washer 65, see Fig. 1.

As shown in Fig. 1, there is supported in parallel relation with shaft 53 another shaft 80 journaled in the brackets 54 and 81. The shaft 80 has three gears, 82, 83 and 84 loosely mounted thereon, these gears cooperating with the pinions of the friction driven mechanisms 57, 58 and 59, respectively. Thus, as shown in Fig. 9, gear 82 cooperates with pinion 61 of friction driven mechanism 57. Attached to gear 82 is a cam disc 85 which has three notches 86, each notch carrying a roller 87 which is pressed by a spring 88 against the rim of a drum 89 which in turn is secured to the shaft 80. Each of the gears 83 and 84 is provided with a cam disc having notches, a roller, a spring and a drum similar in construction to that described in connection with gear 82.

When gear 82 is rotated counterclockwise the cam disc 85 wedges the roller 87 between the cam disc and the drum 89 and accordingly the drum 89 and the shaft 80, to which it is secured, will rotate with the gear 82. On the other hand, if the shaft 80 is being operated in the counterclockwise direction by gear 83 or gear 84 the drum 89 of gear 82 will rotate with the shaft producing an idle rotation of the rollers 87, the gear 82 remaining stationary. Thus it will be noted that the shaft 80 may be operated by any one of the gears 82, 83 or 84 and that when one of these gears is operating the shaft the other two gears remain stationary.

The cam disc 63 is adapted to engage a lug 70 on a contact spring 71 carrying a contact 72 adapted to cooperate with a contact 73 on a contact carrier 74, the contacting mechanism being suitably insulated and carried on a bracket 75 secured to the frame of the machine. Similarly, cam discs 63' and 63'' (Figs. 10 and 11) are adapted to coact with lugs 70' and 70'', respectively.

Mechanisms 58 and 59 are similar in construction to the mechanism 57 except that the number of teeth in the ratchet wheels 62' and 62'' and cam discs 63' and 63'' of these mechanisms is not the same as in the ratchet wheel 62 and cam disc 63 of mechanism 57. Thus, in mechanism 58, the ratchet wheel 62' and cam disc 63' each have eight teeth, and in mechanism 59, the ratchet wheel 62'' and cam disc 63'' each have 12 teeth.

For the purpose of effecting the counting operation by the present device the character matrices comprising a font of type have been divided into three groups, and one of the mechanisms 57, 58 or 59 has been assigned to each group to effect the counting thereof. It is understood, of course, that the character matrices may be divided into any number of groups, and that the number of mechanisms, 57 to 59, will be increased correspondingly; but for the purposes of disclosure of the present embodiment three such groups and mechanisms have been chosen. The character M and other characters of approximately the same width have been assigned to one of the groups, so that when a key representing a character in this group has been depressed it will effect the operation of escapement mechanism 57 to cause the advancement of shutter or indicator 102 one space or graduation on the scale. Also, when a key representing a character in the second group is depressed the friction mechanism 58 will be operated which will cause the index or shutter to move three-fourths of a space on the scale. Lastly, when a key representing a character in the third group is depressed, it will effect the operation of friction mechanism 59 to move the shutter 102 one-half space. Furthermore, each of the 18 spaces are exactly the same with the exception of the widths of the lightly and heavily shaded portions at the right ends thereof, which portions are representative of the number as well as the minimum and maximum thicknesses and expansibility of the spacebands in the line.

It will now be clear that mechanism 57 moves 60 degrees for one step, mechanism 58 moves 45 degrees for one step and mechanism 59 moves 30 degrees for one step. These mechanisms operating the shaft 80 through their respective gears 82, 83 and 84 are adapted to rotate the shaft through three different cycles depending upon which one of the mechanisms is operated. Since the thickness of the character being transmitted determines the selection of the mechanism 57, 58 and 59, it will be obvious that the thickness of the character being transmitted will determine the angle of movement of the shaft 80. The shaft 80 is arranged to operate an indicator 45 which will now be described.

Figure 4:
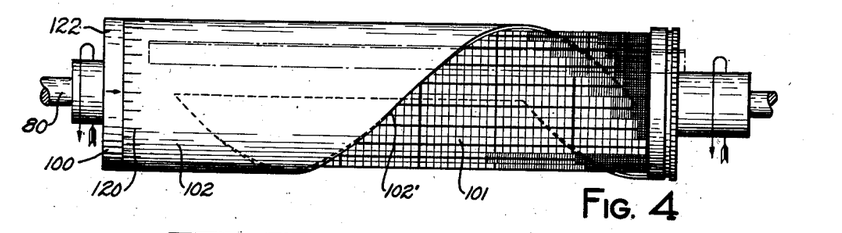
Fig. 4 is a plan view showing the scale member and index.

The indicator, Fig. 4, comprises two main parts, a scale member 100 comprising a series of scales 101 and a helical-edged shutter 102. The scale member 100 in the present embodiment is provided with a chart which is divided into 18 spaces, see Fig. 5. In each space there is drawn along the length thereof a graduated scale which is divided into spaces representing what are known as keyboard ems, that is, if the key for the character M is depressed the indicator will advance one space on the scale irrespective of the character or the size of the type to be used. It will be noted that the scales are graduted from the right so that the reading represents the amount of space left in the line rather than the amount which has already been set. It will be noted further that at the right end of each of the scales, except scales 103 and 104, there is a heavily shaded portion 105 and a lightly shaded portion 106. The portion 105 has a width which corresponds to the thickness of the thin end of the spaceband used and the portion 106 has a width corresponding to the difference in thickness between the thin and thick end of the spaceband so that the portion 106 represents the amount of justification possible in a line containing one spaceband. Scale 107 has a heavily shaded portion, proportionate to the thickness of the thin end of two spacebands and a lightly shaded portion of a width equal to the difference between the thick and thin ends of two spacebands, or the amount of justification possible in a line containing two spacebands.

Figures 5, 6, 7, 8, 8A:
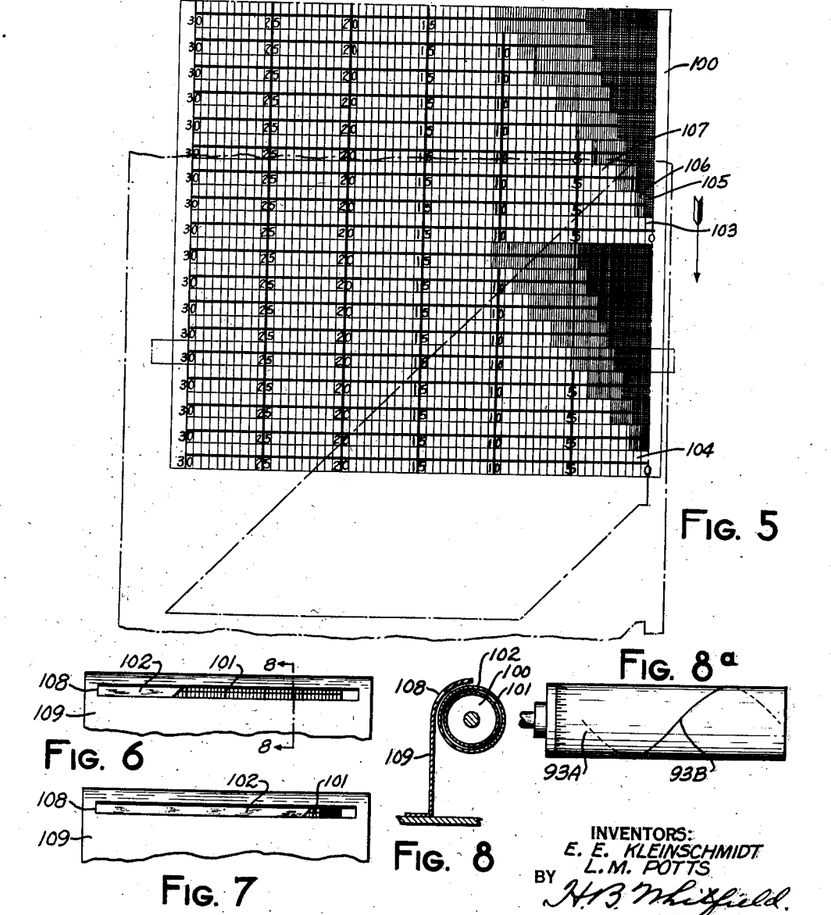
Fig. 5 is a view showing the justifying scale member developed.
Figs. 6 and 7 are fragmentary views showing the slotted cover member with the scale member visible through the slot.
Fig. 8 is a sectional view through the scale member and cover member on line 8—8 in Fig. 6.
Fig. 8a shows a modification of the shutter.

The scale member 100 in the present instance is cylindrical in shape, as shown in Fig. 8, and is located to the rear and adjacent to a slot 108 in a part of the cover 109 of the machine, so that as the scale member is rotated into the different positions only one of the scales will show through the slot. See Figs. 3 and 8.

Figure 20:
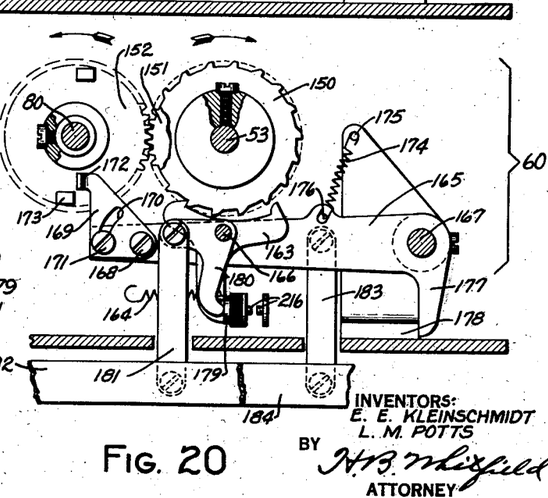
Fig. 20 is a section on line 20—20, Fig. 1, showing the line spacing escapement mechanism.

It will be noted that the scale member 100 has two similar halves, each half comprising nine scales. The top scale in each half has provision for eight spacebands. The bottom scale in each half provides for no spacebands and is called the zero scale and is that point to which the scale member is returned for the beginning of a new line. These series of scales are used alternately, thus, after one of the series of scales has been used, the scale member will be rotated so that the zero position of the other series of scales will assume the beginning-of-line position. The advantage of this arrangement of scales will become apparent when it is seen that it is necessary to rotate the chart only one-half revolution or less to the zero position instead of twice that amount, thus saving considerable time and enhancing the speed of operation of the apparatus. As will presently appear, the scale is rotated step-by-step upon the depression of the space key through the medium of the friction driven member 60 (Fig. 20) which comprises an escapement wheel 150 having 18 teeth, or the same number as the number of scales on the scale member 100. Thus, it is obvious that each time the space key is operated representative of the insertion of a spaceband in the line of composed matrices a perforation will be made in the tape and at the same time the scale member 100 will be rotated through one angular step.

The helical shutter 102 is secured to the shaft 80 so as to rotate therewith and is located between the scale member 100 and the cover 109 so that as the shutter rotates it will gradually cover the scale which happens to be exposed through the slot 108. In the middle of each scale there is a heavy black line and by noting the position where the edge 102' of the helical shutter crosses this line the amount of space left in the line to be filled may be determined. If the end-of-line key (which produces the end-of-line or carriage return perforation in the tape) is depressed before the edge of the shutter reaches the lightly shaded portion of the scale the line will be too short to cast. If the edge of the shutter is in the lightly shaded portion, the line will cast properly, and if the edge has passed beyond the lightly shaded portions into the heavily shaded portion, the line will be too long to cast.

On the left hand end of shutter 102 is a series of graduations 120 cooperating with a series of graduations on the collar 122. By loosening the screw 121 (Fig. 15) the shutter can be rotated with respect to the collar 122 so that the position of the shutter can be changed with respect to the stopping position of the other parts of the mechanism, and as all parts of the indicator are returned to a normal stop position for the beginning of a new line the shutter may be set for any length of line by merely rotating the shutter with respect to the collar.

Figure 21:
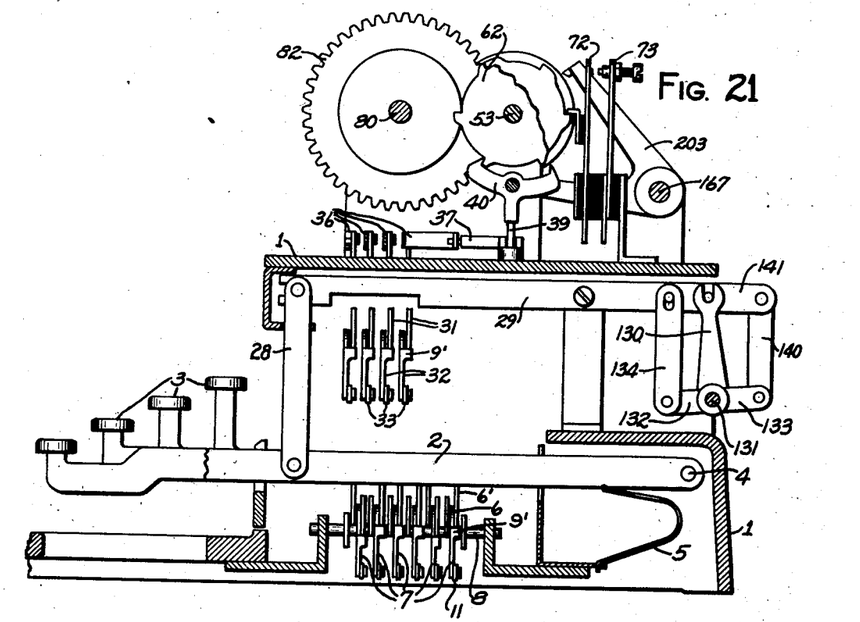
Fig. 21 is a side elevation, partly in section showing the case-shift mechanism.

The mechanism for producing a case shift will now be described in connection with Figs. 21, 22 and 23.

The code bars 29 which determine which one of the bars 31 is operated, or in other words how much the shutter rotates upon the depression of each key, are pivoted in a carrier 130 which in turn is pivoted to the frame at 131. The carrier 130 has two extensions 132 and 133. Extension 132 is connected by a link 134 (Fig. 23) to a lever 135 pivoted at 136 to support 137 and connected by a link 138 to the keylever 139 which controls the transmission of the upper case shift signals. When the keylever 139 (Fig. 23 and Fig. 1) is depressed lever 135 is rocked about its pivot 136 and through link 134, carrier 130 is rotated clockwise and all of the code bars 29 assume their back position as indicated in Fig. 23.

Extension 133 is connected by a link 140 (Fig. 22) to lever 141 which is pivoted at 142 on bracket 143 and connected by a link 144 to a keylever 145 (Figs. 1 and 22), which controls the transmission of the lower case shift signals. When key 145 is depressed lever 141 is rocked counterclockwise around its pivot 142 and through link 140, carrier 130 is rocked to its forward position and the code bars 29 assume their forward position as shown in Fig. 22.

The code bars 29, which are connected to keys in which the upper and lower case characters are of the same width, are arranged to operate the same one of the bars 31 regardless of whether the bars 29 are in the shift or unshift position. This is accomplished by properly shaping the projections on the code bars 29. But the code bars 29, which are connected to keys in which the upper case character is of a different width from the lower case character, are arranged to operate different bars 31 depending upon whether the bars 29 are in the shift or unshift position. This has been illustrated in Figs. 22 and 23. The bar 29 shown in these figures is connected to a key (not shown) in which the lower case character is of an "en" width and the upper case character is of an "em" width.

Figure 22:
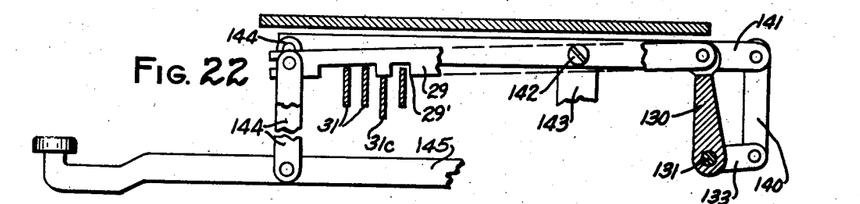
Figs. 22 and 23 are fragmentary sectional views showing the case-shift mechanism in a different position.
Figure 23:
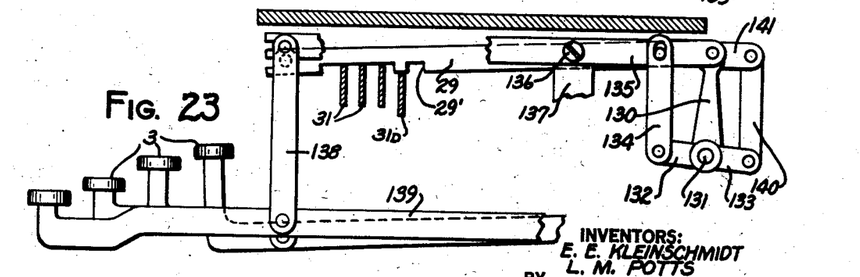

It will be noted that in Fig. 22 the lower case shift lever 145 is depressed and therefore depression of a bar 29 will result in depression of bar 31C and movement of the shutter through a distance corresponding to an "en" space. In Fig. 23, the upper case shift lever 139 is depressed and therefore depression of a bar 29 will result in depression of bar 31D and movement of the shutter through a distance corresponding to an "em" space.

Links 134 and 140 have elongated holes in their upper ends where they are connected with levers 135 and 141, respectively. This permits either of the shift keys to be depressed and to return to normal position without affecting the other shift key. Carrier 130 is held in either position by a jockey roller or other suitable detent (not shown).

Friction driven member 60 (Fig. 20) is composed of an escapement wheel 150 having 18 teeth, or the same number as the number of scales on the scale member 100. It also comprises a gear 151 which meshes with a gear 152 rigidly attached to the scale member 100 so that whenever the escapement wheel 150 moves, the scale member 100 will be moved a corresponding amount. The friction driven escapement wheel 150 tends to turn clockwise but is prevented by pawl 163 which is normally held in engagement with the ratchet wheel 150 by a spring 164. The lever 165 is secured to a rockable shaft 167 pivoted in the frame as shown in Fig. 1. Mounted at 168 on the long arm of lever 165 is an adjustable stop piece 169 having an arcuate slot 170 therein. A screw 171 extends through slot 170 and into lever 165. Loosening of the screw 171 permits adjustment of the stop piece 169 after which the screw may be tightened to maintain the adjustment. The stop piece should be so adjusted that when lever 165 is held in its normal position, or that shown in Fig. 20, lug 172 of stop piece 169 will be out of the path of movement of stop projection 173 carried on gear 152, and scale member 100 will be free to rotate when permitted by the escapement mechanism 60.

A spring 174, having one of its ends connected to a fixed point 175 and its other end connected to the lever 165 at point 176, normally tends to maintain lever 165 in the position shown with its short arm 177 against a stop 178. Escapement pawl 163 has a projection 179 which engages the tip of bell crank 180, pivoted on pin 166 and connected by a link 181 with a keylever 182 which is the spaceband or justifying keylever operated from space bar 182', (Fig. 1). Lever 165 is connected by a link 183 with a keylever 184 which is variously known as the end-of-line, carriage return or elevator keylever.

When keylever 182 is depressed, escapement pawl 163 is operated through bell crank 180 and link 181 to release escapement wheel 150 which will operate one step. Through the gear connections the scale member 100 will be permitted to move a corresponding amount from power furnished through friction clutch 60.

The mechanism 56, shown in detail in Fig. 17, will now be described. It comprises two friction clutches, one within the other. The outer friction clutch comprises the outer sleeve and flange member 190 fixed to the shaft 53 by a screw 191 and cooperating with the splined cam plate 192 which is pressed toward member 190 by the spring 193 abutting against the collar 194 which is fixed to the shaft 53 by means of a screw 195. The members 190 and 192 thus may move toward each other to compress the friction washers 199 and 200 while both of the members 190 and 192 revolve positively with the shaft 53. The inner sleeve and flange member 196 and its companion splined cam plate 197 are mounted loosely upon the sleeve of the member 190. By reason of the splined connection, the two members 196 and 197 may move toward each other to compress the friction washers 201 and 202. The two members 196 and 197 must turn together as a clutch unit. Between the members 196 and 197 and sleeved upon the member 196 is the gear wheel 198. The members 190 and 192 turn continuously with the shaft 53 and through the friction washers 199 and 200 operate to turn the members 196 and 197 when these members are not restrained. The members 196 and 197 when turning operate through the friction washers 201 and 202 to turn the gear wheel 198 when that gear wheel is not restrained.

The spring 193 supplies a pressure to all of the friction washers of the member 56 by reason of the splining of the several parts. The member 197 is restrained by the double dog escapement pallet 203 (Fig. 14) which is carried by the rocking shaft 167 operated through lever 165 and link 183 by the lever 184 of the elevator key. The gear 198 meshes with the gear 204 fixed to the shaft 80 to turn the shutter 102 and is restrained when the stop 205 upon the shutter 102 engages the tip 206 of the arm 207 which also is carried by the rocking shaft 167.

The function of the elevator key is to restore the shutter 102 and the scale member 100 to their respective normal positions and also to control the punching of code perforations in the tape. When the elevator key is depressed it operates arm 165 and rocks the shaft 167 thereby operating arm 207 and double dog 203. Dog 203 removes the restraint from clutch members 196 and 197 which then are driven by the shaft 53 and drive gear wheels 198 and 204 to turn shaft 80 until stop 205 engages the lug 206 of arm 207. The arm 207 stops the shutter and restrains the gear wheel 198. The clutch parts 196 and 197 continue to turn until the attached plate 197' engages the upper tooth 203' of the double dog 203 after which all parts are restrained until the release of the elevator key. Upon the release of the elevator key the arm 207 releases the shutter and elevator key the arm 207 releases the plate 197 and all parts of dog 203 releases the plate 197 and all parts of the double clutch turn until the lower tooth 203" of dog 203 engages the notch 197" in plate 197, when, again, all parts of the clutch stop except 190 and 192. The shutter has been turned through its unused angle to its normal position of rest and is in readiness for the work of the next line.

While the elevator key has been depressed the lever 165 has withdrawn the dog 163 from the wheel 150 and has moved the stop 172 into the path of the stop 173. The clutch mechanism 60 now operates to drive the scale member 100 until the stop 173 engages the stop 172. Upon release of the elevator key, the stops 172 and 173 are disengaged and the pallet 163 engages the wheel 150 to restrain the scale member 100 which now is in its normal position in readiness for the work of the next line.

Friction discs 201 and 202 are smaller than friction discs 199 and 200 so that when the shutter reaches its initial position, a slip will occur at discs 201 and 202 and not at discs 199 and 200 thus permitting the disc 197 and associated parts to complete their operation. The double friction discs also perform another function. When the shutter is moving forward slippage occurs at the small diameter discs 201 and 202 while the disc 197 and associated parts remain in their normal position. This action also provides a braking effect which prevents overthrow due to the inertia of the moving parts.

Figures 14, 15, 16, 17, 18:
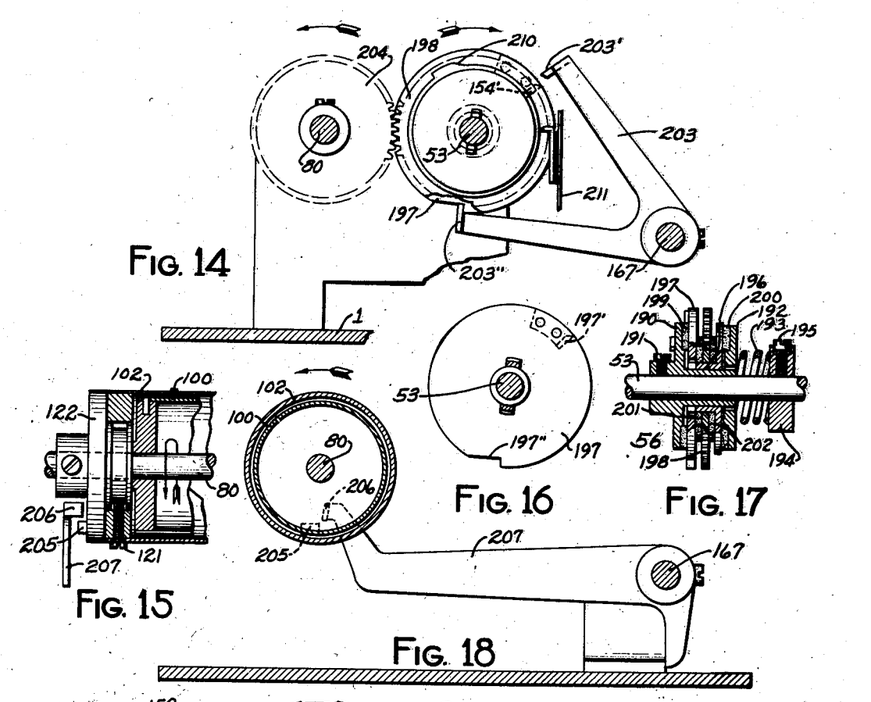
Fig. 14 is a section taken along line 14—14, Fig. 1.
Fig. 15 is a section taken along line 15—15, Fig. 1.
Fig. 16 is a section through shaft 53 showing one of the cam plates.
Fig. 17 is a section taken along line 17—17, Fig. 1.
Fig. 18 is a section taken along line 18—18, Fig. 1.
Figure 19:
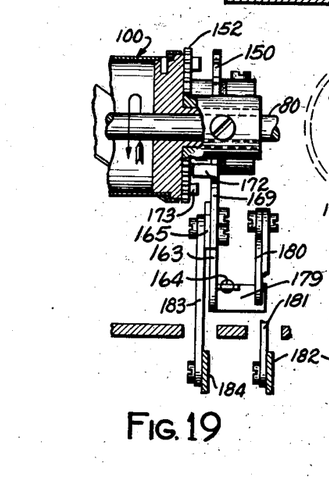
Fig. 19 is a section taken along line 19—19, Fig. 1.

The punching of the code perforations in the tape is effected by the cam 210, Fig. 14, which closes contact points 211, Fig. 1. The punch magnet 18 is energized to operate selected punches 27 to perforate the tape 26 by closing the circuit shown in Fig. 2, some one pair of points being closed by a member in the selecting devices.

When mechanism 56 is operated, the points 211 are closed. When mechanism 57 is operated the points 212 are closed. When mechanism 58 is operated the points 213 are closed. When mechanism 59 is operated the points 214 are closed. When the spacing mechanism 60 is operated the points 216 are closed.

A modified form of shutter is shown in Fig. 8a. This shutter is in the form of a transparent cylinder 93A, with a helical line 93B drawn upon it. The reading is made at the intersection of the line of the scale and the line 93B of the shutter.

The operation of the entire apparatus will now be described.

Depression of a character key 3 operates the associated keylever 2 to engage and depress a combination of the permutation bars, 6 and 6'. The depressed bars 6 and 6' rock member 7 and 7' to move bars 11 and the latter bars rock levers 75

14 to shift the corresponding links 16 into position beneath punch pins 27.

In addition to depressing the permutation bars 6 and 6' the keylever 2 simultaneously operates a lever 29 through the associated link 28. Lever 29 depresses one of the bars 31, the selection of the bar 31 depending upon the thickness of the matrix for which a code combination is to be transmitted, and through rockers 32 and 32', a bar 33 is operated. This bar operates through a lever 35, link 36 and bell crank 37 the corresponding escapement pawl 40. The pawl releases its friction driven mechanism (57, 58 or 59) which rotates one step, operating through its associated gear mechanism, the shaft 80 and shutter 102. During the movement of the friction driven member, a contact 72—73 is closed for energizing the magnet 18 to perforate the tape and to feed the tape one step.

As various character keys are depressed in succession, the shutter 102 is rotated through varying angles, the angle of rotation depending upon the thickness of the matrix, for which a code combination is to be transmitted. As the shutter rotates, its edge 102' moves to the right along the slot 108 and the scale exposed through the slot is gradually covered up. At any point during the operation of the keys, if the operator wishes to determine how much space is left in the line being composed, he has only to observe the point where the edge 102' of the shutter 102 intersects the heavy horizontal line of the scale.

When the operator depresses the bar 182' the lever 182 is depressed operating pawl 163 through bell crank 180 and link 181 to release escapement wheel 150 which will operate one step. Gear 151 rigidly connected to wheel 150 will rotate gear 152 to move the scale member 100 carrying the scales 101 a sufficient amount to bring the next scale into position opposite the slot 108 in the cover member 109. At the same time contacts 216 are closed and the space perforation is made in the tape and the tape is advanced one step. Thus, every time the bar 132' is depressed, the scale member will be rotated one angular step to bring the succeeding scale into position opposite the slot, the tape is perforated and advanced one step.

To operate the case shift mechanism, keylever 139 is depressed. This operates link 138 to rock lever 135 about its pivot 136 and raise link 134 thereby rocking member 130 clockwise. Levers 29 are thus moved rearwardly and depression of a character key will result in the operation by levers 29 of different bars 31 than would be operated if the case shift mechanism had not been operated. Thus, when the bars 29 are in the unshift position, as shown in Fig. 22, depression of a character key will result in operation of bar 31C and movement of the shutter through a distance corresponding to an "en" space. On the other hand, when the bars 29 are in the shift position, as shown in Fig. 23, depression of the same character key will result in operation of bar 31D and movement of the shutter through a distance corresponding to an "em" space. Depression of keylever 139 also sets the permutation bars 6 and 6' for the shift combination, closes contacts 215 and causes the shift perforation to be made in the tape, but no operation of the counting mechanism takes place.

The unshift key performs similar operations.

To begin a new line, the elevator or justification key is depressed. This operates arm 165 and rocks the shaft 167 thereby operating arm 207 and double dog 203. Dog 203 removes the restraint from clutch members 196 and 197 which then are driven by the shaft 53 and drive gear wheels 198 and 204 to turn shaft 80 until stop 205 engages the lug 206 of arm 207. This stops the shutter and restrains the gear wheel 198. The clutch parts 196 and 197 continue to turn until the attached plate 197' engages the upper tooth 203' of the double dog 203 after which all parts are restrained until the release of the elevator key.

The elevator or justification key also sets the bars 6, 6' in the proper permutation to perforate the elevator signal hole in the tape and closes contacts 215 to energize the perforating magnet to make the perforations and advance the tape. The function of the perforation thus produced by the operation of the elevator or justification key is to initiate in the automatically controlled linecasting machine the movement of the assembled line of matrices collected in the assembling elevator of said machine to the casting position where automatic justification of the line takes place just prior to the casting operation.

Upon the release of the elevator key, the arm 207 releases the shutter and dog 203 releases the plate 197 and all parts of the double clutch turn until the lower tooth 203" of dog 203 engages the notch 197" in plate 197, when, again, all parts of the clutch stop except 190 and 192. The shutter has been turned through its unused angle to its normal position of rest and is in readiness for the work of the next line.

When the elevator key is depressed, the lever 165 withdraws the dog 163 entirely from operative relation with the wheel 150 and moves the stop 172 into the path of the stop 173. The clutch member 60 then operates to drive the scale member 100 until the stop 173 engages the stop 172. When the elevator key is released the stops 172 and 173 are disengaged and the pallet or dog 163 again engages the wheel 150 to restrain the scale member 100, which is then in its normal position in readiness for the work of the next line.

Although the present invention has been disclosed and described with reference to a linecasting machine it is, of course, understood that the invention is capable of embodiment in many and widely varied forms other than that specifically disclosed without departing from the spirit and scope of the present invention.

What is claimed is:

1. In a keyboard device having a plurality of character keys, a chart, an indicating member for cooperating with said chart, a series of unidirectional friction driven members, and means for selecting one of said members in accordance with the key depressed to move the indicating member in a single direction with respect to the chart, each friction driven member being arranged to move the indicating member a different amount.

2. In combination with a keyboard comprising a plurality of keys, a scale, an index member, means under the control of a plurality of keys to move the index member with respect to said scale to indicate a quantity corresponding to the keys depressed in succession, and key initiated means to move automatically the index member invariably in the same direction to give an indication corresponding to the beginning of the operation of a new series of keys.

3. In a keyboard device for preparing control strips for controlling composing machines which use matrices of predetermined thicknesses, keylevers corresponding to the matrices, a constantly rotating shaft, clutch mechanism controlled by said keylevers and driven by said shaft, and means variably driven by said clutch mechanism for totalizing the thickness of the matrices corresponding to the keys operated in response to the successive operation of said keys.

4. In a keyboard device for preparing control strips for controlling composing machines which use matrices of different predetermined thicknesses, keylevers corresponding to the matrices, a constantly rotating shaft, a plurality of clutch mechanisms, one individual to each thickness of matrix controlled by said keylevers and driven by said shaft, and means variably driven by said clutch mechanisms for totalizing the thickness of the matrices corresponding to the keys operated in response to the successive operation of said keys.

5. In a keyboard device for preparing control strips for controlling composing machines which use matrices of fixed thicknesses and justifying matrices of adjustable thickness, keylevers corresponding to the matrices of fixed thicknesses, a justifying key, means responsive to the operation of said keylevers for indicating the totalized thickness of the matrices corresponding to the keylevers operated, and means comprising a changing scale having predetermined data of varying value indicated thereon effective upon each operation of the justifying key for indicating the cumulative expansibility of the justifying matrices corresponding to the number of times the justifying key has been operated in a given series, said last mentioned means cooperative with said first mentioned means to indicate the justifiability of a line.

6. In a keyboard device for preparing control strips for controlling composing machines which use matrices of fixed thicknesses and justifying matrices of adjustable thickness, keylevers corresponding to both kinds of matrices, and a single indicator comprising a helical index member and a cylindrical chart, said index member responsive to the operation of certain of said keys for indicating the totalized thickness of the matrices corresponding to the keylevers operated and said chart responsive to the operation of another of said keylevers to indicate the totalized minimum and maximum thicknesses of justifying matrices corresponding to the number of times said another of said keylevers has been operated in a given series.

7. In a keyboard device for preparing control strips for controlling composing machines which use matrices of fixed thicknesses and justifying matrices of adjustable thickness, keylevers corresponding to both kinds of matrices, a constantly rotating shaft, clutch mechanism driven by said shaft and controlled by said keys, means variably driven by said clutch mechanism responsive to the operation of said keys for indicating the totalized thickness of the matrices corresponding to the keylevers operated, and means for indicating the totalized minimum and maximum thicknesses of justifying matrices corresponding to the number of times the justifying key has been operated in a given series.

8. In a device for preparing a control strip suitable for the control of composing machines having automatic justification within a certain range, a plurality of keys, an indicator provided with a movable scale to indicate continuously the justifying minimum and maximum limits of the justifying range, an index member cooperative with said scale to indicate the remaining space for a given length of line that is to be set up by the operation of said keys, and means controlled by said keys for controlling said indicator.

9. In a keyboard device for preparing a control strip suitable for the control of composing machines having automatic justification within a certain range, a plurality of keys, indicating mechanism comprising a movable chart adapted to indicate continuously the entire justifying range, an index member adapted to indicate the remaining space in the line of composed matter corresponding to a series of keys actuated when setting up a given length of line, and means controlled by said keys for controlling said indicating mechanism.

10. In a keyboard device for preparing a control strip for the control of type composing machines comprising a plurality of character keys and a space key, a cylinder carrying a series of scales, a tubular index member concentric with the cylinder, means controlled by said space key to rotate said cylinder to display a new scale, and means controlled by said character keys to move said index member variably on said scale in accordance with the keys depressed.

11. In a keyboard device having a plurality of character keys and a justifying key, a chart, an indicating member cooperating with said chart, means controlled by said character keys to move said indicating member variably, and means controlled by said justifying key to move said chart.

12. In a keyboard device having a plurality of character keys and a justifying key, a chart, an indicating member cooperating with said chart, means controlled by said character keys to move said indicating member, means controlled by said justifying key to move said chart, and means for moving said chart and said indicating member in the same direction to a point corresponding to the beginning of a new line.

13. In a keyboard device having a plurality of character keys and a justifying key, a chart member, an indicating member cooperating with said chart member, means controlled by said character keys to move one of said members, means controlled by said justifying key to move the other of said members in the same direction, and means for moving said chart and said indicating member in the same direction to a point corresponding to the beginning of a new line.

14. In a keyboard device having a plurality of character keys, a chart, an indicating member cooperating with said chart, a plurality of constantly driven clutch members, each arranged to move said indicating member a different amount, and means for selecting one of said members in accordance with the key actuated to move said indicating means with respect to the chart.

15. In a keyboard device having a plurality of character keys, indicating means, a plurality of clutches, each arranged to adjust said indicating means a different amount, and means controlled by said keys for selectively operating said clutches in accordance with the keys actuated to cause said driven members to variably adjust said indicating means.

16. In a keyboard device having a plurality of character keys, indicating means, a plurality of clutches each comprising a constantly driven driving member and a driven member, said driven members being arranged to adjust said indicating means different amounts, and means controlled by said keys for selectively operating said clutches in accordance with the keys actuated to cause said driven members to variably adjust said indicating means.

17. In a keyboard device, indicating mechanism, a motor, a plurality of clutches driven by said motor, means driven by each of said clutches connected to and adapted to change the indication of said mechanism a different amount, and a plurality of keys for controlling the initiation of operation of said means according to the keys actuated.

18. In combination with a keyboard having a plurality of keys, indicating mechanism, a motor, a plurality of clutches driven by said motor, means associated with one of said clutches to advance the indication of said mechanism when said keys are actuated, and means associated with another of said clutches to move said mechanism to an initial position controlled by one of the keys of said keyboard.

19. In combination with a keyboard comprising a plurality of keys, a scale, an index adjacent to the scale, means controlled by said keys to move said index, an elevator key to be operated after the operation of a series of keys corresponding to a line of characters, and means controlled by said elevator key including a constantly driven clutch to move said index to a point on said scale corresponding to the beginning of a line.

20. In a keyboard device for preparing a control strip for the control of typesetting machines comprising a plurality of character keys, a scale, an index adjacent said scale, means controlled by said keys to move said index in a single direction with respect to said scale, an elevator key to be operated after the operation of a series of keys corresponding to a line of characters, and means controlled by said elevator key to move automatically said index invariably in said direction to a point on said scale corresponding to the beginning of a line.

21. In combination, a plurality of character keys, a scale, an index adjacent said scale, constantly driven clutch mechanism controlled by said keys to move said index, an elevator key to be operated after the operation of a series of keys corresponding to a line of characters, and means controlled by said elevator key including constantly driven clutch mechanism to move said index to a point on said scale corresponding to the beginning of a line.

22. In a keyboard, a scale member, an index member, a series of keys corresponding to a series of characters, a single justifying key, means to move one of said members in a single direction for each operation of a character key, and means controlled by the justifying key to move the other of said members in the same direction, the combined effect of said movements being to indicate the justifiability of a line.

23. In a keyboard device, a constantly rotating shaft, a plurality of unit wheels mounted on said shaft, and a single indicating mechanism common to said plurality of unit wheels, said unit wheels adapted to variably control the movement of said indicating mechanism.

24. In a keyboard device, a constantly rotating shaft, a plurality of unit wheels mounted on said shaft, a single indicating mechanism common to said plurality of unit wheels, and totalizing means whereby said unit wheels are adapted to control the increments of operation of said indicating mechanism.

25. In a keyboard device, a counting device, said counting device including a constantly rotating shaft and a plurality of unit wheels mounted on said shaft, a single indicating device common to said plurality of unit wheels, and control means associated with said counting device whereby said counting device is adapted to operate said indicating device incrementally.

26. In a keyboard device, a counting mechanism, a scale, an index member, a series of keys, means to move said index member in a single direction with respect to said scale in accordance with the operation of said counting mechanism as determined by the key operated, and means invariably controlled by one of said keys to control the return of said index member invariably in the same direction to its normal position.

27. In a keyboard apparatus, a series of keylevers, a series of selector bars common to said keylevers, a plurality of elements, said keylevers effective for actuating said bars for selecting certain of said elements, a space key, and a counting mechanism controlled in accordance with the element selected for indicating respective widths of characters individual to said keylevers and justifiability of a line, including a scale, an index member, power driven means for moving said index member relatively to said scale in varying amounts dependent upon the particular element selected, and additional means operative step-by-step upon operation of the space key and adapted to cooperate with said index member to indicate the justifiability of a line.

28. In a keyboard device suitable for the production of control strips representative of consecutive characters and expansible word spacers, a series of keys, a single scale, an index member movable variably with respect to said scale in response to the operation of said keys to indicate the cumulative widths of characters, means associated with said scale for moving the same for indicating the cumulative expansibility of the word spacers, and a special key operative to effect a relative change in said means to correspond to the increment of expansibility provided by a spacer, said last recited means and said index member cooperating to indicate the justifiability of a line.

29. In a keyboard device having a plurality of character keys and a justifying key, a scale, an indicating member cooperating with said scale, means controlled by said character keys to move said indicating member, and means controlled by said justifying key to move said scale.

EDWARD E. KLEINSCHMIDT.
LOUIS M. POTTS.